(12) United States Patent
Kim et al.

(10) Patent No.: US 8,483,349 B2
(45) Date of Patent: Jul. 9, 2013

(54) SPACER GRID FOR DUAL-COOLING NUCLEAR FUEL RODS USING INTERSECTIONAL SUPPORT STRUCTURES

(75) Inventors: Jae-Yong Kim, Daejeon (KR); Hyung-Kyu Kim, Daejeon (KR); Kyung-Ho Yoon, Daejeon (KR); Young-Ho Lee, Daejeon (KR); Kang-Hee Lee, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 656 days.

(21) Appl. No.: 12/181,891

(22) Filed: Jul. 29, 2008

(65) Prior Publication Data

US 2010/0027734 A1 Feb. 4, 2010

(51) Int. Cl.
*G21C 3/34* (2006.01)

(52) U.S. Cl.
USPC .............................. 376/438; 376/441; 376/442

(58) Field of Classification Search
USPC .................................................. 376/438–443
See application file for complete search history.

(56) References Cited

U.S. PATENT DOCUMENTS

| | | | | |
|---|---|---|---|---|
| 3,663,367 A | * | 5/1972 | Calvin | 376/439 |
| 3,928,132 A | | 12/1975 | Bujas | |
| 4,725,403 A | * | 2/1988 | Buettiker | 376/439 |
| 4,913,875 A | * | 4/1990 | Johansson et al. | 376/439 |
| 5,032,351 A | * | 7/1991 | Johansson | 376/438 |
| 6,909,765 B2 | | 6/2005 | Lahoda | |

FOREIGN PATENT DOCUMENTS

| | | |
|---|---|---|
| JP | 05-281384 | 10/1993 |
| JP | 05281384 | 10/1993 |
| KR | 10-2001-0001422 | 1/2001 |
| KR | 1020010001422 | 1/2001 |

\* cited by examiner

*Primary Examiner* — Timothy A Brainard

(74) *Attorney, Agent, or Firm* — H.C. Park & Associates, PLC

(57) ABSTRACT

A spacer grid for dual-cooling nuclear fuel rods arranged at a narrow interval. The spacer grid solves the problem in which, since the dual-cooling nuclear fuel rods are used to improve the cooling performance and stability of nuclear fuel and obtain high burnup and output, the outer diameter of each dual-cooling nuclear fuel rod is increased, and thus the gap between each dual-cooling nuclear fuel rod and the grid strap is decreased. The spacer grid includes first grid straps and second grid straps, which are crossed and arranged in transverse and longitudinal directions at regular intervals and have the shape of a flat strip, and support structures, which are fitted into the first and second grid straps around intersections of the first and second grid straps so as to support the dual-cooling nuclear fuel rods.

20 Claims, 22 Drawing Sheets

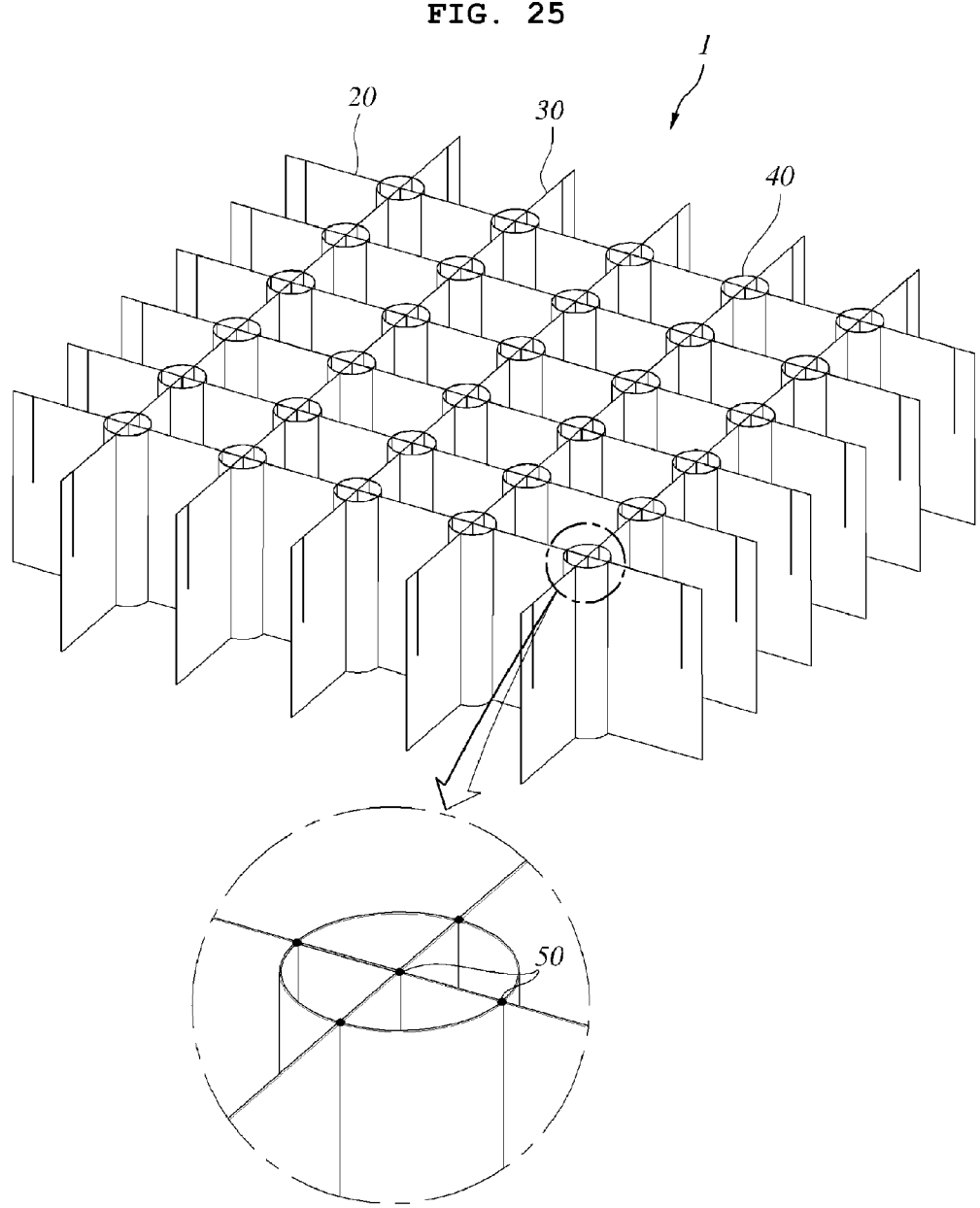

ary shape, an inner clad tube 12, enclosing the inner circumference of the sintered compact 11, and an outer clad tube 13, enclosing the outer circumference of the sintered compact 11. Thus, the coolant flows outside and inside the dual-cooling nuclear fuel rod 10, so that heat transfer is doubled. As a result, the dual-cooling nuclear fuel rod 10 maintains a low surface temperature.

SPACER GRID FOR DUAL-COOLING NUCLEAR FUEL RODS USING INTERSECTIONAL SUPPORT STRUCTURES

BACKGROUND OF THE INVENTION

1. Field of the Invention

The present invention relates, in general, to a spacer grid for dual-cooling nuclear fuel rods, which has been developed in order to reduce the core temperature of a nuclear fuel rod, thereby ensuring the safety of the nuclear fuel rod even at super high burnup, and increasing output to obtain economical effects and, more particularly, to a spacer grid for dual-cooling nuclear fuel rods using intersectional support structures, in which the intersectional support structures are fitted into grid straps around intersections of the grid straps in order to compensate for reduction in a gap between the nuclear fuel rod and the support structure due to an increase in diameter compared to an existing nuclear fuel rod, thereby supporting each dual-cooling nuclear fuel rod in a diagonal direction.

2. Description of the Related Art

FIG. 1 is a schematic perspective view illustrating a conventional nuclear fuel assembly. FIG. 2 is a schematic horizontal cross-sectional view illustrating a conventional nuclear fuel assembly. FIG. 3 is a schematic top plan view illustrating a spacer grid, which is applied to a conventional nuclear fuel assembly. FIG. 4 is a schematic perspective view illustrating a spacer grid, which is applied to a conventional nuclear fuel assembly. FIG. 5 is a schematic perspective view illustrating a unit grid strap for a spacer grid supporting a conventional nuclear fuel assembly.

As illustrated in the figures, the nuclear fuel assembly 100 comprises nuclear fuel rods 110, guide pipes 140, spacer grids 150, a top end piece 120, and a bottom end piece 130.

Here, each nuclear fuel rod 110 has a cylindrical uranium sintered compact in a clad pipe of zircaloy (zirconium alloy). This uranium sintered compact is fissioned to produce high-temperature heat.

Meanwhile, each guide pipe 140 is used as a passage for a control rod, which moves up and down in order to control the output of a reactor core and to stop a fission reaction. Each spacer grid 150 is one of the components constituting the nuclear fuel assembly in a nuclear reactor, and is designed so that a spring 118 and dimples 119 of each unit grid strap support the nuclear fuel rods 110 such that the nuclear fuel rods 110 are arranged at designated positions.

When the spring force of the spring 118 and the dimples 119 is too weak, each nuclear fuel rod 110 cannot be supported at a designated position, and thus may not be soundly supported. In contrast, when the spring force of the spring 118 and the dimples 119 is too strong, each nuclear fuel rod 110 undergoes defects, such as scratching, on the surface thereof due to excessive frictional resistance when it is inserted into the spacer grid. Further, during the operation of the nuclear reactor, the nuclear fuel rods 110 experience longitudinal growth by means of the irradiation of neutrons. When this longitudinal growth is not properly accommodated, the nuclear fuel rods 110 undergo bowing.

In this manner, when the nuclear fuel rods 110 undergo bowing, they come nearer to or contact neighboring nuclear fuel rods 110. Thus, a coolant channel, i.e. a sub-channel 115, between the nuclear fuel rods becomes narrow or is blocked. As a result, the heat generated from the nuclear fuel rods is not effectively transmitted to the coolant, thereby increasing the temperature of the nuclear fuel rods. As such, the possibility of generating Departure from Nucleate Boiling (DNB) is increased, which is mainly responsible for the reduction of nuclear fuel output.

The top end piece 120 and the bottom end piece 130 fixedly support the nuclear fuel assembly 100 on upper and lower structures of the reactor core. The bottom end piece 130 includes a filter (not shown) for filtering foreign materials floating in the reactor core.

Meanwhile, each spacer grid 150 is usually made of zircaloy, and includes nuclear fuel rod cells, which support the nuclear fuel rods 110, and guide pipe cells, into which the guide pipes 140 are inserted. Each nuclear fuel rod cell is designed to support each nuclear fuel rod 110 at a total of six supporting points using a total of two grid springs 118, which are located on two respective faces of the nuclear fuel rod cell, and a total of four dimples 119, which are located in pairs above and below the two grid springs 118 and on the other two respective faces.

A cylindrical uranium dioxide compact is charged into each nuclear fuel rod 110, and the coolant rapidly flows from the bottom to the top of the reactor core in the axial direction through sub-channels 115, each of which is enclosed by four nuclear fuel rods 110 or by three nuclear fuel rods 110 and one guide pipe 140.

Here, each sub-channel 115 refers to a space enclosed by the nuclear fuel rods 110, and particularly a passage through which a fluid can freely flow to the neighboring sub-channel because it has an open side.

Meanwhile, as illustrated in FIGS. 6 and 7, a dual-cooling nuclear fuel rod 10 having an annular structure instead of the cylindrical nuclear fuel rod 110 is disclosed in U.S. Pat. Nos. 3,928,132 and 6,909,765.

Here, the dual-cooling nuclear fuel rod 10 having an annular structure includes a sintered compact 11 having an annular shape, an inner clad tube 12, enclosing the inner circumference of the sintered compact 11, and an outer clad tube 13, enclosing the outer circumference of the sintered compact 11. Thus, the coolant flows outside and inside the dual-cooling nuclear fuel rod 10, so that heat transfer is doubled. As a result, the dual-cooling nuclear fuel rod 10 maintains a low surface temperature.

In this manner, in the case in which the dual-cooling nuclear fuel rod 10 is maintained at a low core temperature, the possibility of damaging the fuel due to an increase in the core temperature of the nuclear fuel is reduced, so that the safety margin of the dual-cooling nuclear fuel rod 10 can be increased, and the dual-cooling nuclear fuel rod 10 provides high burnup and high output.

However, in order to make the dual-cooling nuclear fuel rods 10 structurally compatible with an existing pressurized water reactor (PWR) core, the gap between the nuclear fuel rods becomes considerably narrower compared to that between existing nuclear fuel rods because the positions of the guide pipes 140 cannot be changed in the nuclear fuel assembly 100, and because the outer diameter of each nuclear fuel rod is increased. For example, in the case in which the nuclear fuel assembly is formed according to a design draft for the dual-cooling nuclear fuel rods having a 12×12 array, the gap between the nuclear fuel rod and the unit grid strap is reduced from 1.45 mm, which is the size of the existing gap, to about 0.39 mm.

Thus, due to the narrow gap between the nuclear fuel rod and the unit grid strap, it is impossible to use the existing method of forming fuel rod support structures to realize contact at the portions where the fuel rod support structures intersect the nuclear fuel rods in order to support the nuclear fuel rods.

SUMMARY OF THE INVENTION

Accordingly, the present invention has been made keeping in mind the above problems occurring in the related art, and an object of the present invention is directed to a spacer grid for the stable support of dual-cooling nuclear fuel rods, which are used for improving the cooling performance and stability of nuclear fuel and obtaining high burnup and output, despite a narrow gap by fitting separate support structures, which are capable of supporting the dual-cooling nuclear fuel rods, around intersections of grid straps for a spacer grid instead of springs and dimples formed for each existing grid strap, such that the dual-cooling nuclear fuel rods are soundly supported for their entire lifespan.

According to one aspect of the present invention, there is provided a spacer grid for dual-cooling nuclear fuel rods using intersectional support structures. The spacer grid comprises: first grid straps and second grid straps, which are crossed and arranged in transverse and longitudinal directions at regular intervals and have a shape of a flat strip; and support structures, which are fitted into the first and second grid straps around intersections of the first and second grid straps so as to support the dual-cooling nuclear fuel rods.

Here, each of the first grid straps may include first grid slits spaced apart from each other at regular intervals at one of upper and lower portions thereof, and first fastening slits formed on opposite sides of the respective first grid slits. Each of the second grid straps may include second grid slits spaced apart from each other at regular intervals at one of upper and lower portions thereof, and second fastening slits formed on opposite sides of the respective second grid slits at a remaining portion thereof.

Further, each support structure may include slits at corners of a prism having a quadrilateral cross section so as to be coupled with the first fastening slits and the second fastening slits, and supports supporting the dual-cooling nuclear fuel rods on faces thereof.

Alternatively, each support structure may include slits in corners of a prism having a quadrilateral cross section so as to be coupled with the first fastening slits and the second fastening slits, and supports having one of concave, convex and planar shapes in a longitudinal direction on faces thereof so as to be in contact with outer circumferences of the dual-cooling nuclear fuel rods.

At this time, each support structure may be formed by bending a rectangular sheet at a right angle.

Meanwhile, each support structure may include four slits in a circumference of a cylinder having a circular cross section at right angles so as to be coupled with the first fastening slits and the second fastening slits, and supports supporting the dual-cooling nuclear fuel rods between the four slits.

Further, each support may include a contact portion, which comes into contact with an outer circumference of each dual-cooling nuclear fuel rod after each dual-cooling nuclear fuel rod is charged, and connector portions, which extend from upper and lower ends of the contact portion in a curved shape.

Here, the contact portion may have a concave shape so as to have a curvature equal to that of the outer circumference of each dual-cooling nuclear fuel rod after each dual-cooling nuclear fuel rod is charged. Alternatively, the contact portion may have a convex shape or a simple planar shape protruding toward each dual-cooling nuclear fuel rod in consideration of the rigidity of the supports.

Further, each support structure may additionally include dimples at upper and lower portions of each support.

In addition, the first grid straps, the second grid straps, and the support structures may be welded to each other.

As apparent from the foregoing description, the support structures are fitted into the first and second grid straps around the intersections of the first and second grid straps so as to allow the dual cooling nuclear fuel rods, each of which undergoes an increase in diameter and has very high burnup, to be soundly supported during an entire lifespan, despite a narrow gap between each dual cooling nuclear fuel rod and each grid strap, so that the spacer grid can stably support the dual cooling nuclear fuel rods.

Further, it is not necessary to change the positions of the guide pipes within the nuclear fuel assembly, and it is possible to use the top and bottom end pieces as they stand, so that the spacer grid can maintain compatibility with constituent parts of an existing nuclear fuel assembly without changing or modifying an existing reactor core structure.

In addition, the support structures are fitted into the grid straps around the intersections of the grid straps without performing plastic working on each grid strap to form the springs and dimples, so that the spacer grid can promote impact strength against lateral load.

BRIEF DESCRIPTION OF THE DRAWINGS

The above and other objects, features and other advantages of the present invention will be more clearly understood from the following detailed description when taken in conjunction with the accompanying drawings, in which:

FIG. 25 is a perspective view illustrating a spacer grid according to a fourth embodiment of the present invention.

DETAILED DESCRIPTION OF THE INVENTION

Figure 1:
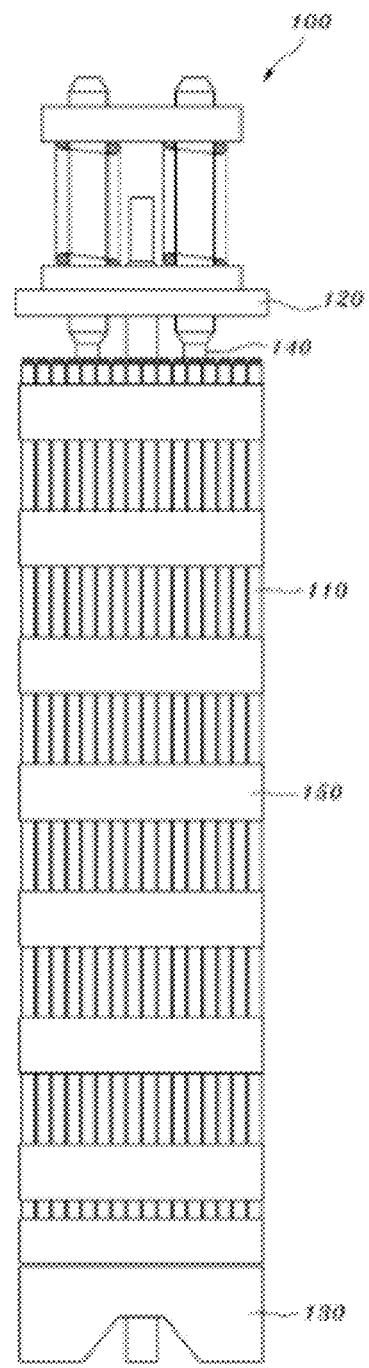
FIG. 1 is a schematic perspective view illustrating a conventional nuclear fuel assembly.
Figure 2:
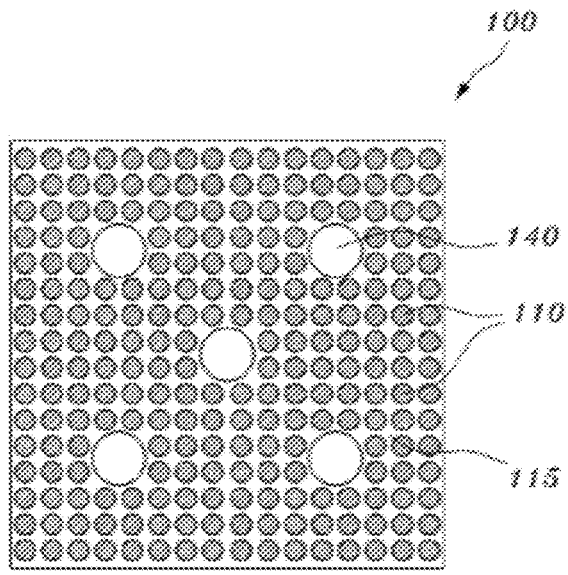
FIG. 2 is a schematic horizontal cross-sectional view illustrating a conventional nuclear fuel assembly.
Figure 3:
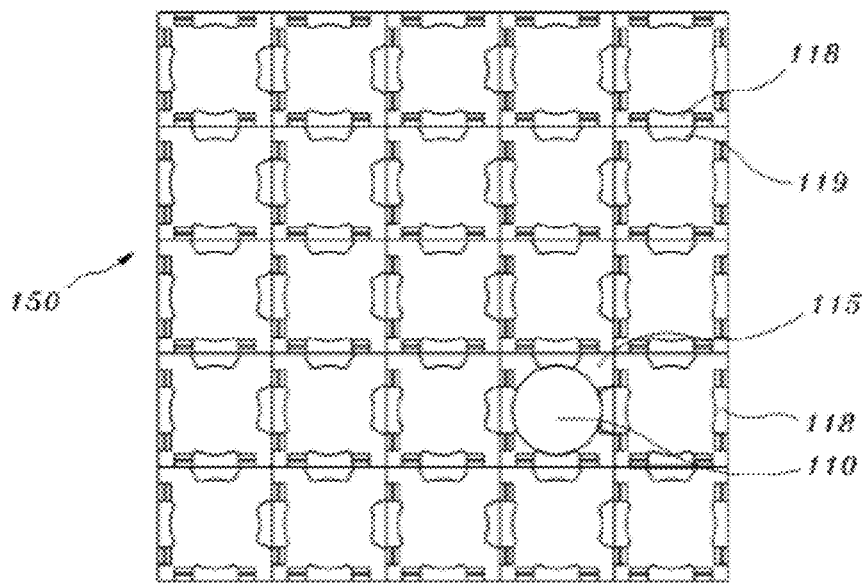
FIG. 3 is a schematic top plan view illustrating a spacer grid, which is applied to a conventional nuclear fuel assembly.
Figure 4:
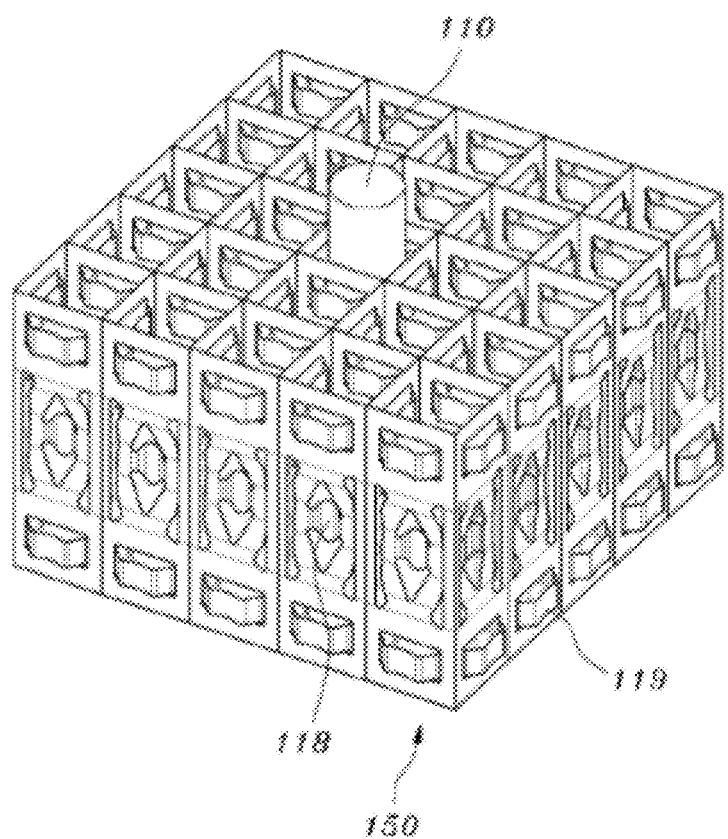
FIG. 4 is a schematic perspective view illustrating a spacer grid, which is applied to a conventional nuclear fuel assembly.
Figure 5:
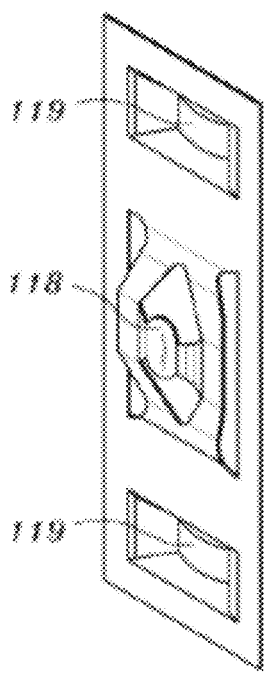
FIG. 5 is a schematic perspective view illustrating a unit grid strap for a spacer grid supporting a conventional nuclear fuel assembly.
Figure 6:
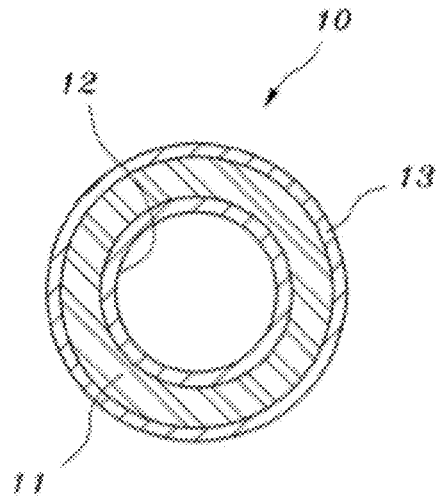
FIG. 6 is a schematic horizontal cross-sectional view illustrating a dual-cooling nuclear fuel rod.
Figure 7:
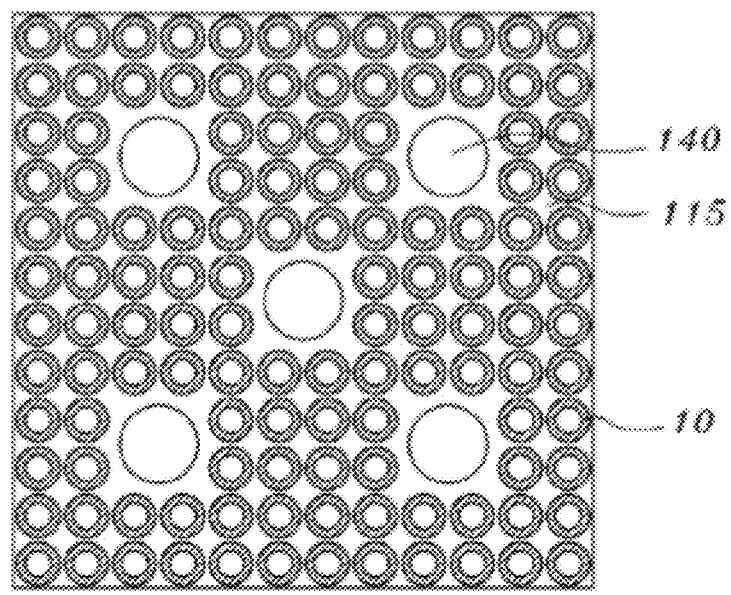
FIG. 7 is a schematic horizontal cross-sectional view illustrating a dual-cooling nuclear fuel assembly.

Reference will now be made in greater detail to exemplary embodiments of the invention, an example of which is illustrated in the accompanying drawings. Wherever possible, the same reference numerals will be used throughout the drawings and the description to refer to the same or like parts.

Figure 8:
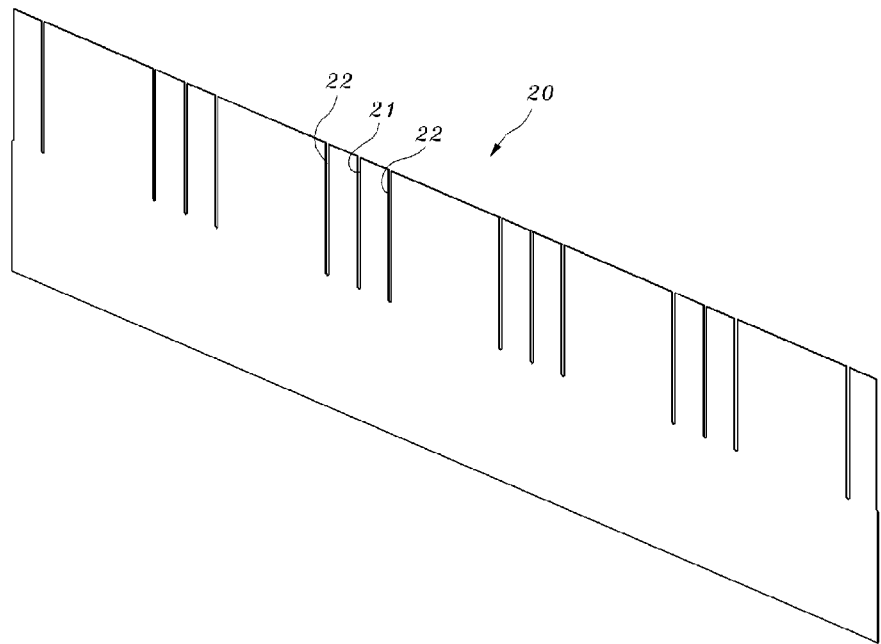
FIG. 8 is a perspective view illustrating a first grid strap according to an exemplary embodiment of the present invention.
Figure 9:
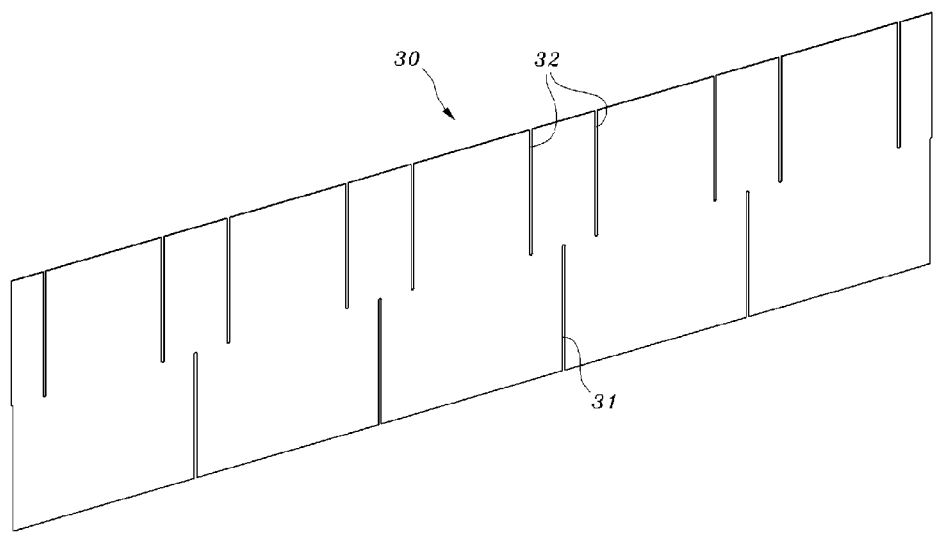
FIG. 9 is a perspective view illustrating a second grid strap according to an exemplary embodiment of the present invention.
Figure 10:
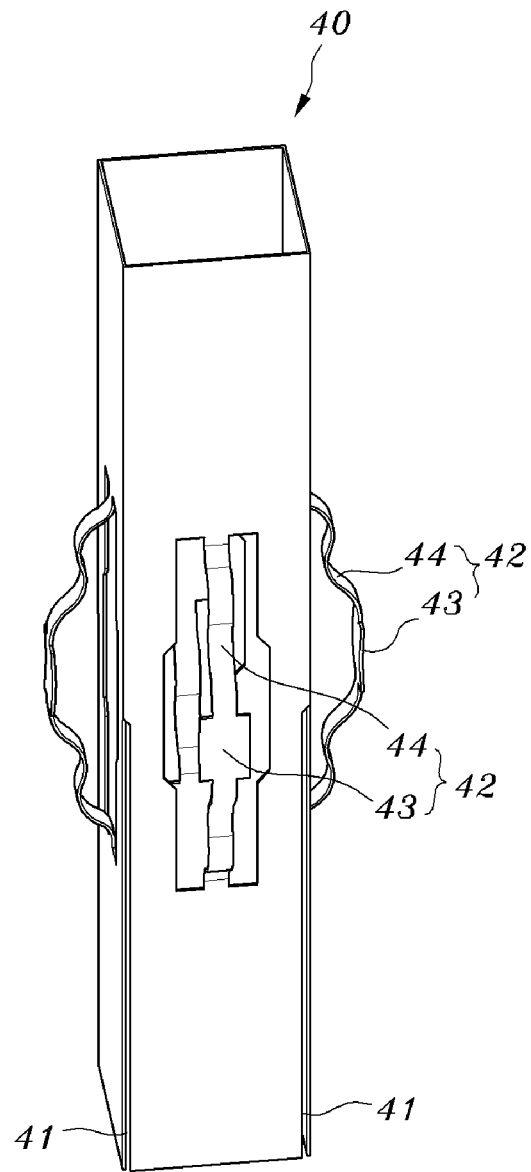
FIG. 10 is a perspective view illustrating a support structure applied to a first embodiment of the present invention.
Figure 11:
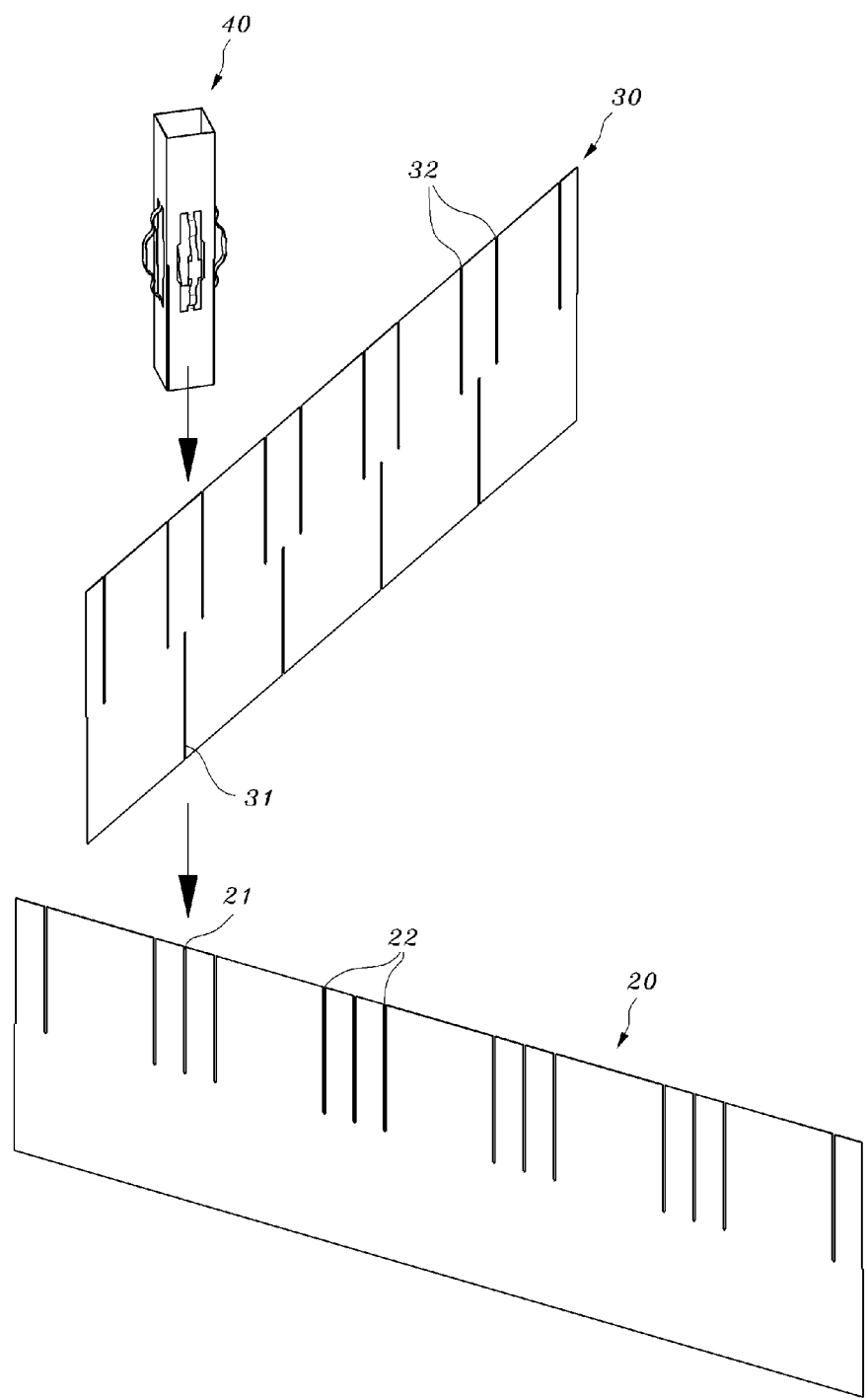
FIG. 11 is an assembled view illustrating the sequence of assembling a first grid strap, a second grid strap and a support structure.
Figure 12:
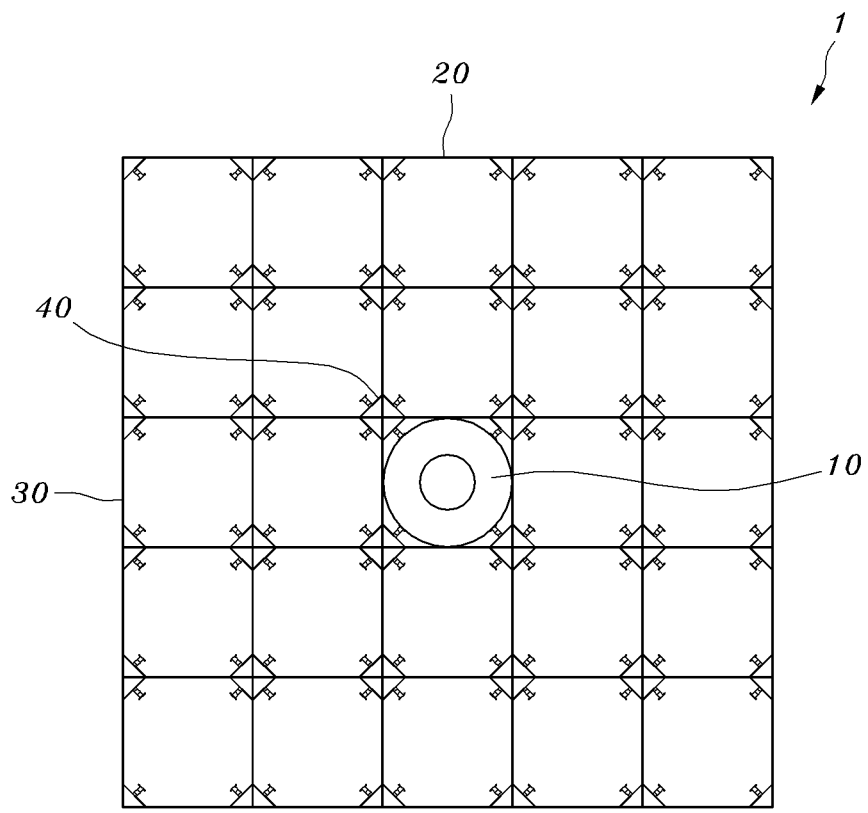
FIG. 12 is a top plan view illustrating a support structure applied to a first embodiment of the present invention.
Figure 13:
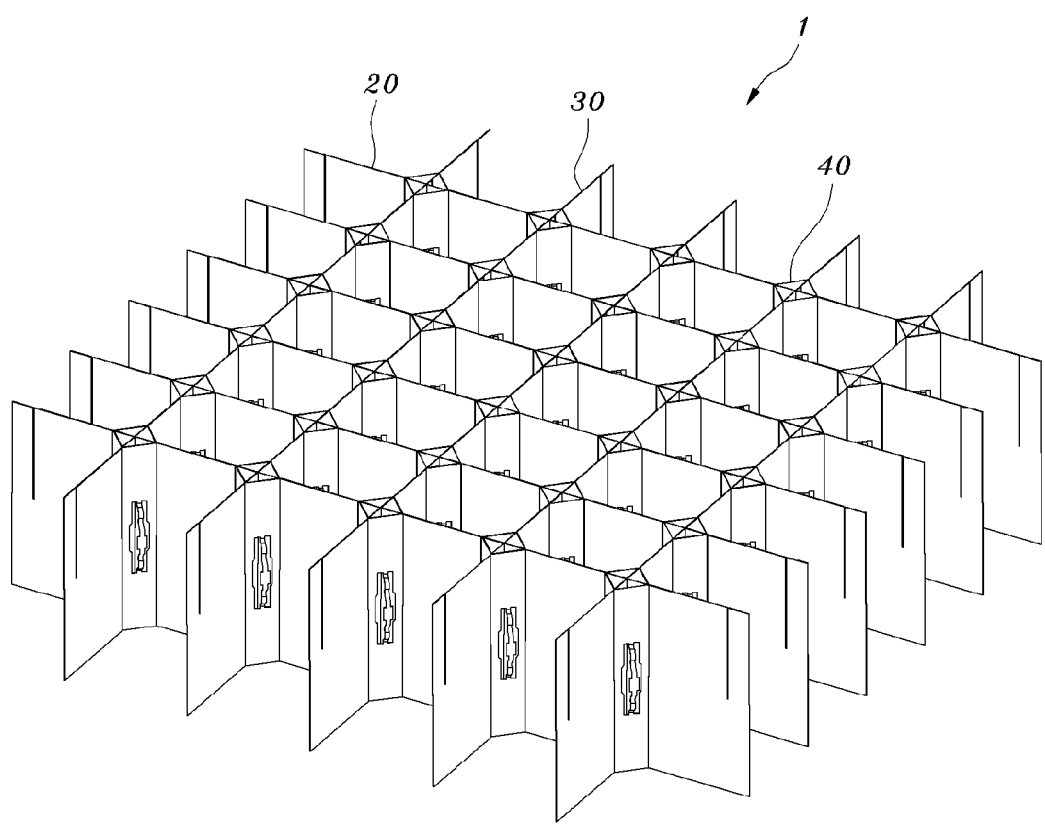
FIG. 13 is a perspective view illustrating a spacer grid according to a first embodiment of the present invention.
Figure 14:
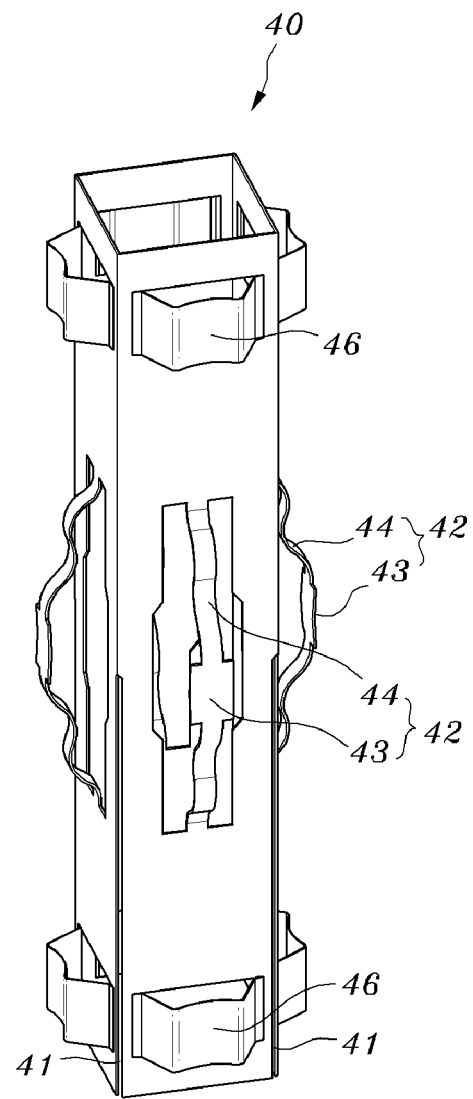
FIG. 14 is a perspective view illustrating a support structure, which is applied to a first embodiment of the present invention and to which dimples are additionally provided.

FIG. 8 is a perspective view illustrating a first grid strap according to an exemplary embodiment of the present invention. FIG. 9 is a perspective view illustrating a second grid strap according to an exemplary embodiment of the present invention. FIG. 10 is a perspective view illustrating a support structure applied to a first embodiment of the present invention. FIG. 11 is an assembled view illustrating the sequence of assembling a first grid strap, a second grid strap and a support structure. FIG. 12 is a top plan view illustrating a support structure applied to a first embodiment of the present invention. FIG. 13 is a perspective view illustrating a spacer grid according to a first embodiment of the present invention. FIG. 14 is a perspective view illustrating a support structure, which is applied to a first embodiment of the present invention and to which dimples are additionally provided.

The spacer grid 1 of the present invention comprises first grid straps 20 and second grid straps 30, which are crossed and arranged in transverse and longitudinal directions, respectively, at regular intervals and have the shape of flat strips, and support structures 40, which are fitted into the first and second grid straps 20 and 30 around intersections of the first and second grid straps 20 and 30 so as to support dual-cooling nuclear fuel rods 10.

In detail, the plurality of first grid straps 20 and the plurality of second grid straps 30 are crossed and arranged in the transverse and longitudinal directions to thereby define spaces in which the dual-cooling nuclear fuel rods 10 are accommodated. In order to stably support the dual-cooling nuclear fuel rods 10, the support structures 40 are fitted into the first and second grid straps 20 and 30 around the intersections of the first and second grid straps 20 and 30.

As illustrated in FIG. 8, each of the first grid straps 20 has the shape of a flat strip, and is provided with two types of slits, first grid slits 21 and first fastening slits 22, at one of upper and lower portions thereof.

First, the first grid slits 21 are spaced apart from each other at regular intervals at the upper portion of each of the first grid straps 20 so as to be able to be coupled with second grid slits 31 of the second grid straps 30, which will be described below. The first fastening slits 22 are formed on opposite sides, that is, left-hand and right-hand sides, of the respective first grid slits 21 such that the support structures 40 for supporting the dual-cooling nuclear fuel rods 10 can be inserted.

In other words, the plurality of first grid slits 21 and the plurality of first grid slits 22, which are formed in each of the first grid straps 20, are formed on the upper portion of each of the first grid straps 20 at regular intervals. The first grid slits 21 are coupled with second grid slits 31 of each of the second grid straps 30, and the first fastening slits 22 are coupled with slits 41 formed in each support structure 40, which will be described below.

Here, the first grid slits 21 and the first fastening slits 22 are formed at the upper portion of each of the first grid straps 20. However, the first grid slits 21 and the first fastening slits 22 may be formed in the lower portion of each of the first grid straps 20.

As illustrated in FIG. 9, each of the second grid straps 30 has the shape of a flat strip, and is provided with two types of slits, second grid slits 31 and second fastening slits 32, at lower and upper portions thereof, like the first grid straps 20.

The second grid slits 31 are spaced apart from each other at regular intervals at the lower portion of each of the second grid straps 30 so as to be able to be coupled with the first grid slits 21 of the first grid straps 20, which will be described below. The second fastening slits 32 have the same intervals therebetween as the first fastening slits 22, and are formed on opposite sides, that is, left-hand and right-hand sides, of the respective second grid slits 31 at the upper portion of each of the second grid straps 30.

If the first grid slits 21 and the first grid slits 22 are provided at the lower portion of each of the first grid straps 20, the second grid slits 31 must be provided at the upper portion of each of the second grid straps 30, and the second fastening slits 32 must be provided at the lower portion of each of the second grid straps 30.

In this case, the support structures 40 for supporting the dual-cooling nuclear fuel rods 10, which will be described below, are coupled to the first and second grid straps 20 and 30 from the bottom to the top.

As illustrated in FIG. 10, each support structure 40, applied to a first embodiment of the present invention, is provided with slits 41 at corners of a prism having a quadrilateral cross section so as to be coupled with the first fastening slits 22 and the second fastening slits 32.

At this time, the diagonal length of each support structure 40 must be equal to the interval between the first fastening slits 22 of each of the first grid straps 20 and the interval between the second fastening slits 32 of each of the second grid straps 30.

Specifically, in order to mutually couple the first grid straps 20 and the second grid straps 20 in a crossed state and then fit the support structures 40 into the first and second fastening slits 22 and 32 formed in the first and second grid straps, the diagonal length between the slits 41 formed in the corners of each support structure 40 in a diagonal direction must be equal to the transverse or longitudinal interval between the first fastening slits 22 and the transverse or longitudinal interval between the second fastening slits 32.

In this embodiment, since the slits 41 are provided with the respective lower corners of each support structure 40, the support structures 40 are adapted to be assembled with the first and second grid straps 20 and 30 from the bottom to the top. Alternatively, the slits 41 may be provided with respective upper corners of each support structure 40, and the support structures 40 may be assembled with the first and second grid straps 20 and 30 from the top to the bottom.

To this end, the first fastening slits 22 and the second fastening slits 32 must be provided at the lower portion of each of the first grid straps 20 and at the lower portion of each of the second grid straps 30, respectively.

Each support structure 40 having the quadrilateral cross section is provided with supports 42, which support the dual-cooling nuclear fuel rods 10, on faces thereof. Each support 42 includes a contact portion 43, which comes into contact with the outer circumference of each dual-cooling nuclear fuel rod 10 after each dual-cooling nuclear fuel rod 10 is charged, and connector portions 44, which extend from upper and lower ends of the contact portion 43 in a curved shape.

Here, the contact portion 43 of the support 42, which is formed on each face of the support structure 40, protrudes toward each dual-cooling nuclear fuel rod 10 around the intersections of the first and second grid straps 20 and 30 so as to be in contact with the outer circumference of each dual-cooling nuclear fuel rod 10.

Further, the connector portions 44 extend from the upper and lower ends of the contact portion 43 in a curved shape in order to provide constant elastic force to the contact 43.

Thus, the connector portions 44 elastically support the contact portion 43 protruding from each face of the support structure 40, and thus elastically support each dual-cooling nuclear fuel rod 10 through the contact portion 43.

In FIG. 10, the contact portion 43 has a concave shape, the curvature of which is equal to that of the outer circumference of each dual-cooling nuclear fuel rod 10 so as to be in surface contact with each dual-cooling nuclear fuel rod 10 after each dual-cooling nuclear fuel rod 10 is charged. Alternatively, in consideration of the rigidity of each support 42, the contact portion 43 may protrude toward each dual-cooling nuclear fuel rod 10 in a convex shape or in a simple plane shape.

The support structure 40 is obtained by performing punching and plastic working on a rectangular sheet using a press machine, etc. so as to form the slits 41 and the supports 42, having the contact portion 43 and the connector portions 44, and then by bending the rectangular sheet into a quadrilateral prism.

FIG. 11 illustrates an example in which the first grid strap 20, the second grid strap 30, and the support structure 40 are assembled into the spacer grid 1 of the present invention.

As illustrated in FIG. 11, the second grid strap 30 is assembled to the first grid strap 20 from the top to the bottom such that the second grid slits 31 of the second grid strap 30 are coupled to the first grid slits 21 of the first grid strap 20. Then, the first and second grid straps 20 and 30 are attached to each other around the intersections thereof by, for instance, welding.

Then, the support structure 40 is fitted into the first and second grid straps 20 and 30 from the top to the bottom such that the slits 41 in the corners of the support structure 40 are coupled with the first and second fastening slits 22 and 32 in the grid straps. Subsequently, the support structure 40 and the grid straps are attached to each other around the intersections thereof by, for instance, welding.

As in FIGS. 12 and 13, the support structures 40 are fitted into the first and second grid straps 20 and 30 around the intersections of the first and second grid straps 20 and 30, and then are coupled with the first and second grid straps 20 and 30 by, for instance, welding. Thereby, the dual-cooling nuclear fuel rods 10 can be accommodated into square spaces surrounded by the first and second grid straps, and can then be stably supported by the supports 42 of the support structures 40 fitted into the intersections of the first and second grid straps.

As illustrated in FIG. 14, each face of the support structure 40 illustrated in FIG. 10 is additionally provided with dimples 46 in upper and lower portions thereof in order to maintain sound supporting performance of each dual-cooling nuclear fuel rod 10.

The dimples 46 protrude from the respective faces of the support structure 40 toward the respective dual-cooling nuclear fuel rods 10 so as to be in surface contact with the outer circumferences of the dual-cooling nuclear fuel rods 10, and have a concave contact face, the curvature of which is equal to that of the outer circumference of each dual-cooling nuclear fuel rod 10 after each dual-cooling nuclear fuel rod 10 is charged.

In FIG. 14, although each dimple 46 has the concave contact face, the curvature of which is equal to that of the outer circumference of each dual-cooling nuclear fuel rod 10, so as to be in surface contact with the outer circumference of each dual-cooling nuclear fuel rod 10, each dimple may have a contact face having a convex shape or a simple planar shape which protrudes toward each dual-cooling nuclear fuel rod 10 in order to ensure reliable supporting performance of each dual-cooling nuclear fuel rod 10.

Figure 15:
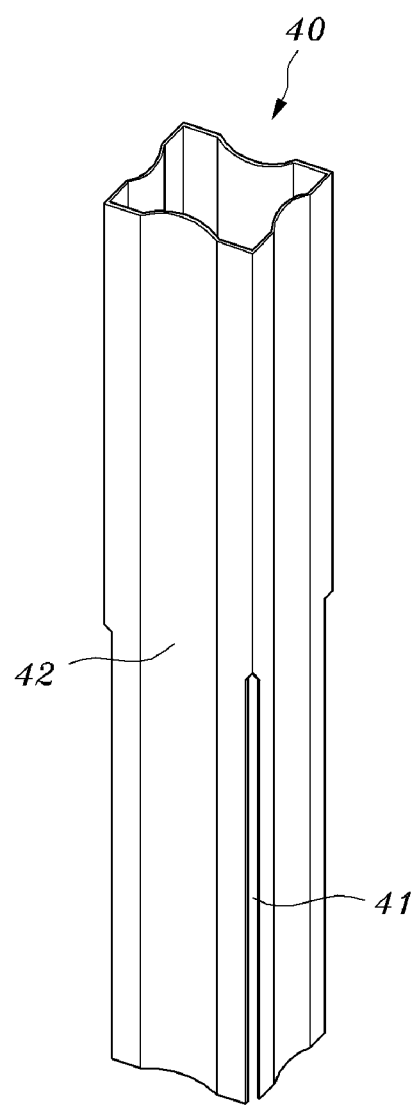
FIG. 15 is a perspective view illustrating a support structure applied to a second embodiment of the present invention.

FIG. 15 illustrates a support structure applied to a second embodiment of the present invention. The support structure 40 is provided with slits 41 in corners of a prism having a quadrilateral cross section so as to be coupled with the first fastening slits 22 and the second fastening slits 32, and concave supports 42 in faces thereof in the longitudinal direction so as to be in surface contact with the outer circumference of each dual-cooling nuclear fuel rod 10.

Further, each support 42 may be formed after cutting parts of upper and lower portions of each face of the support structure 40 in consideration of the rigidity of the support structure 40 or the fretting (or wear) characteristics of each dual-cooling nuclear fuel rod 10 resulting from the support structure 40.

In the case in which each support 42 has a concave shape, it is preferably adapted to have the same curvature as the outer circumference of each dual-cooling nuclear fuel rod 10 so as to be in surface contact with the outer circumference of each dual-cooling nuclear fuel rod 10 after each dual-cooling nuclear fuel rod 10 is charged.

Further, the diagonal length of the support structure 40 must be equal to the interval between the first fastening slits 22 of each of the first grid straps 20 and the interval between the second fastening slits 32 of each of the second grid straps 30.

Specifically, in order to mutually couple the first grid straps 20 and the second grid straps 20 in a crossed state and then insert the support structures 40 into the first and second fastening slits 22 and 32 formed in the first and second grid straps, the diagonal length between the slits 41 formed in the corners of each support structure 40 in a diagonal direction must be equal to the transverse or longitudinal interval between the first fastening slits 22 and the transverse or longitudinal interval between the second fastening slits 32.

The support structure 40 is obtained by performing punching and plastic working on a rectangular sheet using a press machine or the like so as to form the slits 41 and the supports 42, and then by bending the rectangular sheet into a quadrilateral prism.

The method of manufacturing the spacer grid according to a second embodiment of the present invention is performed in the same way as in the first embodiment, and thus will not be described below.

Figure 16:
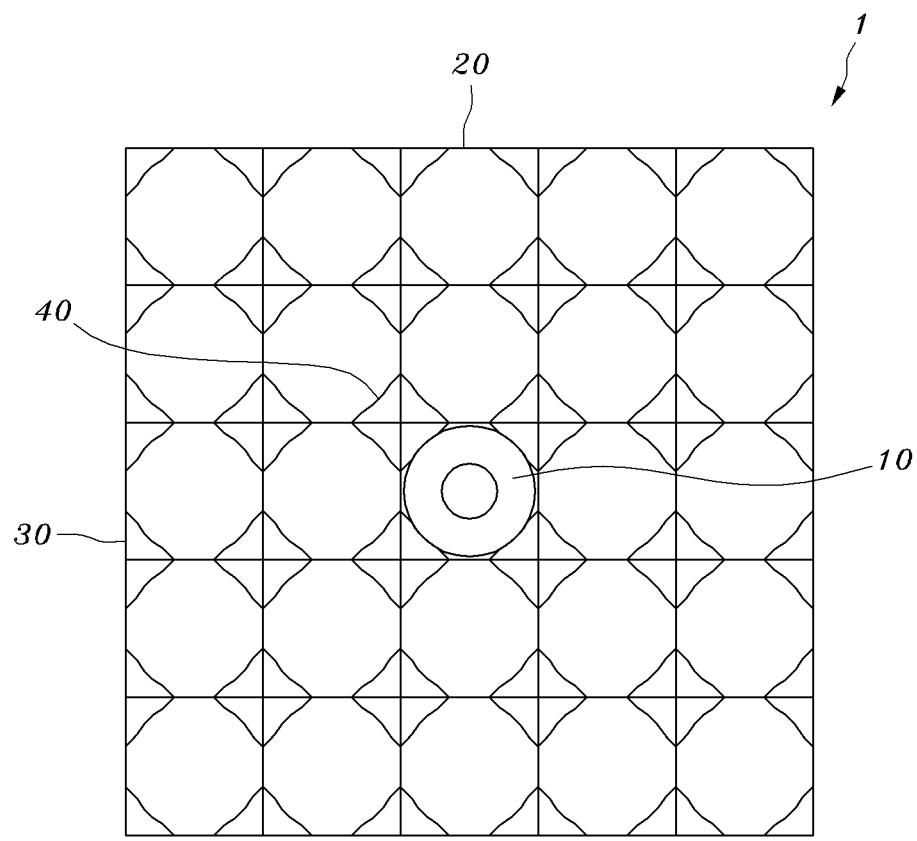
FIG. 16 is a top plan view illustrating a spacer grid according to a second embodiment of the present invention.
Figure 17:
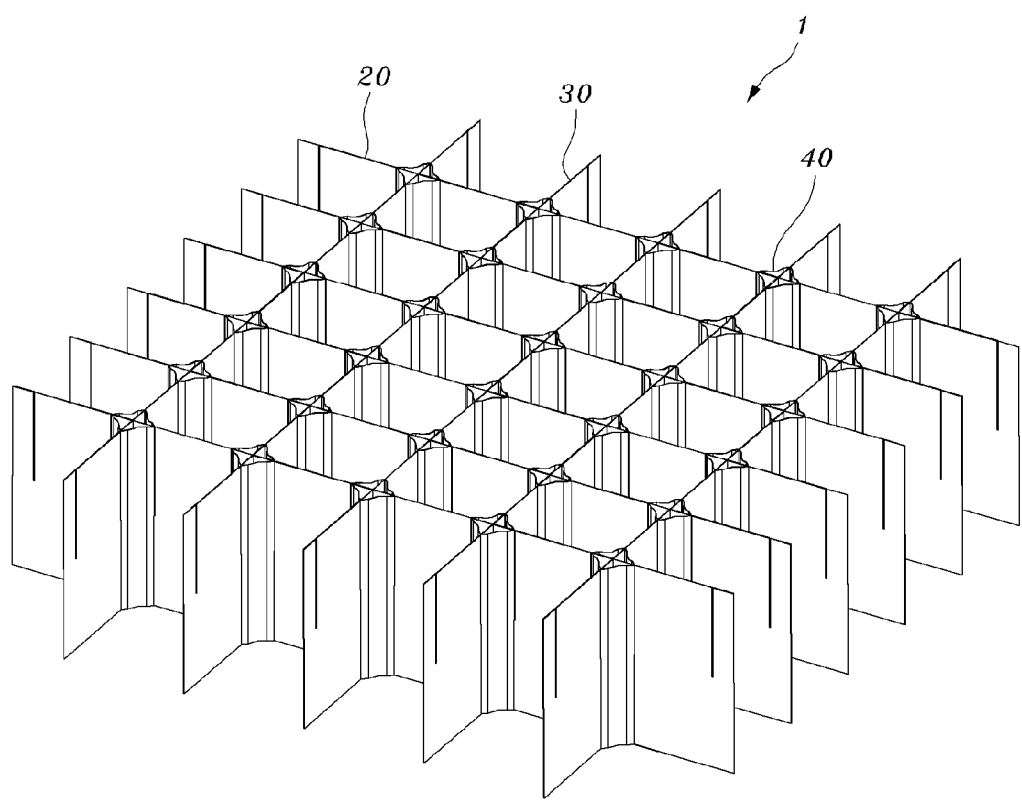
FIG. 17 is a perspective view illustrating a spacer grid according to a second embodiment of the present invention.

As in FIGS. 16 and 17, the support structures 40 are fitted into the first and second grid straps 20 and 30 around the intersections of the first and second grid straps 20 and 30, and then are coupled with the first and second grid straps 20 and 30 by, for instance, welding. Thereby, the dual-cooling nuclear fuel rods 10 can be accommodated into square spaces surrounded by the first and second grid straps, and can then be stably supported by the supports 42 of the support structures 40 fitted into the intersections of the first and second grid straps.

Figure 18:
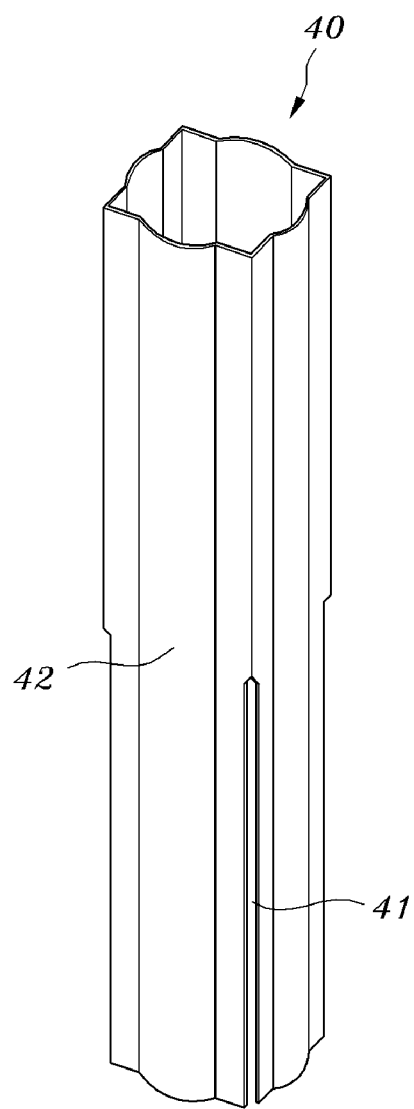
FIG. 18 is a perspective view illustrating a support structure, which is applied to a second embodiment of the present invention and has convex supports.

FIG. 18 is a perspective view illustrating a support structure which is applied to the second embodiment of the present invention and has convex supports. Each support 42 protrudes toward each dual-cooling nuclear fuel rod 10 in a convex shape, and thus contacts the outer circumference of each dual-cooling nuclear fuel rod 10 so as to be able to support each dual-cooling nuclear fuel rod 10.

Although not illustrated in FIGS. 17 and 18, each support 42 may have the shape of a flat plate.

Further, each support 42 may be formed after cutting parts of upper and lower portions of each face of the support structure 40 in consideration of the rigidity of the support structure 40 or the fretting (or wear) characteristics of each dual-cooling nuclear fuel rod 10, attributable to the support structure 40.

Figure 19:
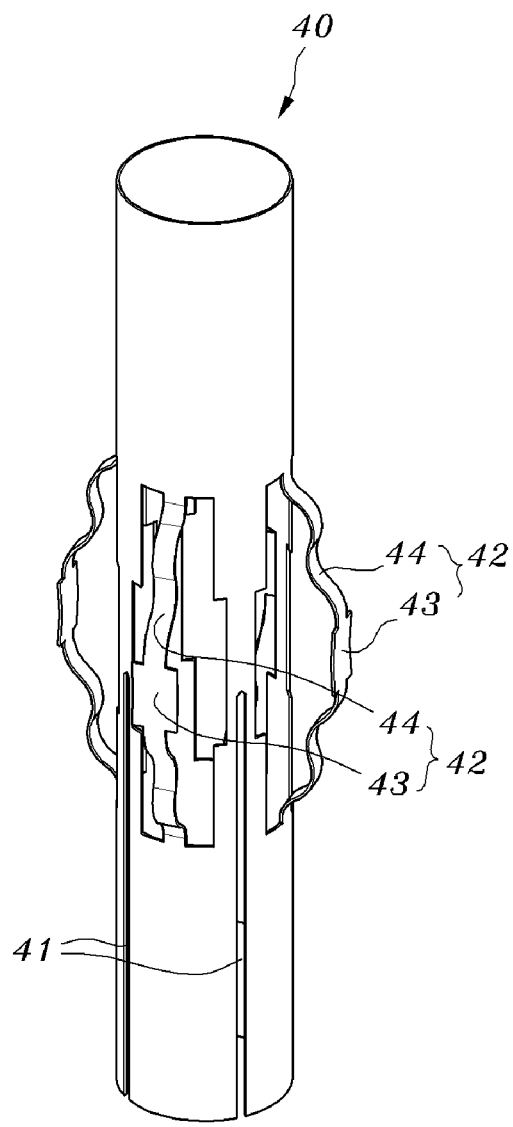
FIG. 19 is a perspective view illustrating a support structure applied to a third embodiment of the present invention.

FIG. 19 illustrates a support structure applied to a third embodiment of the present invention. The support structure 40 is provided with four slits 41 in the circumference of a cylinder having a circular cross section at right angles so as to be coupled with the first fastening slits 22 and the second fastening slits 32, and supports 42, supporting the dual-cooling nuclear fuel rods 10 between the four slits 41.

At this time, the interval between the first slit 41 in the circumference of the support structure 40 and the third slit 41 facing the first slit in a diagonal direction must be equal to the interval between the first fastening slits 22 in each of the first grid straps 20 and the interval between the second fastening slits 32 in each of the second grid straps 30.

The supports 42 supporting the dual-cooling nuclear fuel rods 10 are arranged at four places on the circumference of the support structure 40 having the circular cross section at the same interval. Each support 42 includes a contact portion 43, which comes into contact with the outer circumference of each dual-cooling nuclear fuel rod 10 after each dual-cooling nuclear fuel rod 10 is charged, and connector portions 44, which extend from upper and lower ends of the contact portion 43 in a curved shape.

Here, the contact portion 43 of the support 42 of the support structure 40 protrudes toward each dual-cooling nuclear fuel rod 10 around the intersections of the first and second grid straps 20 and 30 so as to be in contact with the outer circumference of each dual-cooling nuclear fuel rod 10.

Further, the connector portions 44 extend from the upper and lower ends of the contact portion 43 in a curved shape in order to provide a constant elastic force to the contact 43.

Thus, the connector portions 44 elastically support the contact portion 43 protruding from one of the four places of the circumference of the support structure 40, and thus elastically support each dual-cooling nuclear fuel rod 10 through the contact portion 43.

In FIG. 19, the contact portion 43 has a concave shape, the curvature of which is equal to that of the outer circumference of each dual-cooling nuclear fuel rod 10 so as to be in surface contact with each dual-cooling nuclear fuel rod 10 after each dual-cooling nuclear fuel rod 10 is charged. Alternatively, in consideration of the rigidity of each support 42, the contact portion 43 may protrude toward each dual-cooling nuclear fuel rod 10 in a convex shape or in a simple planar shape.

The support structure 40 is obtained by performing punching and plastic working on a rectangular sheet using a press machine or the like so as to form the slits 41 and the supports 42 having the contact portion 43 and the connector portions 44, and then by rolling the rectangular sheet in a cylindrical shape.

Figure 20:
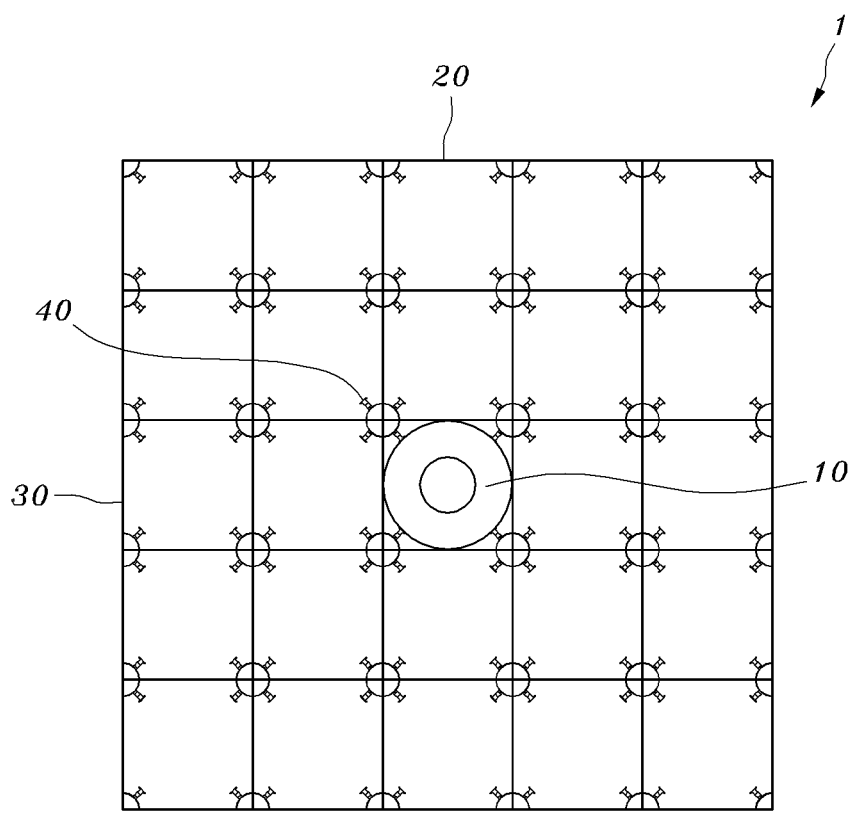
FIG. 20 is a top plan view illustrating a spacer grid according to a third embodiment of the present invention.
Figure 21:
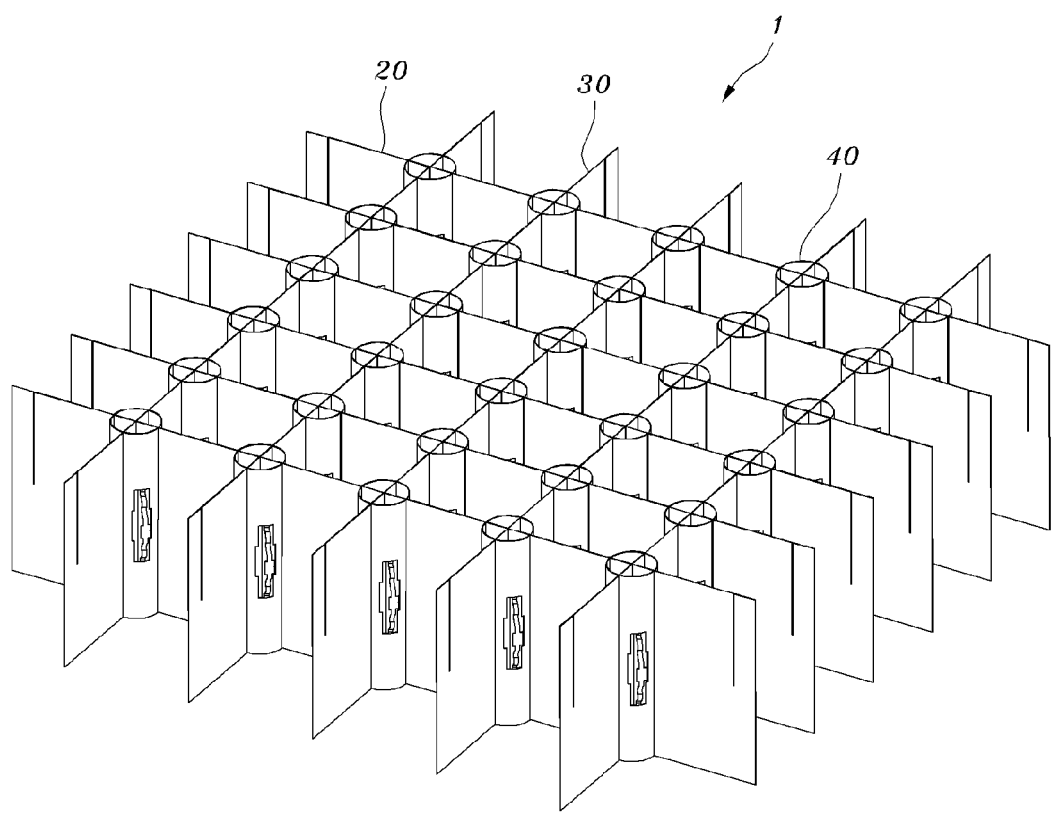
FIG. 21 is a perspective view illustrating a spacer grid according to a third embodiment of the present invention.

As in FIGS. 20 and 21, the support structures 40 are fitted into the first and second grid straps 20 and 30 around the intersections of the first and second grid straps 20 and 30, and then are coupled with the first and second grid straps 20 and 30 by, for instance, welding. Thereby, the dual-cooling nuclear fuel rods 10 can be accommodated into square spaces surrounded by the first and second grid straps, and can then be stably supported by the supports 42 of the support structures 40 fitted into the intersections of the first and second grid straps.

Figure 22:
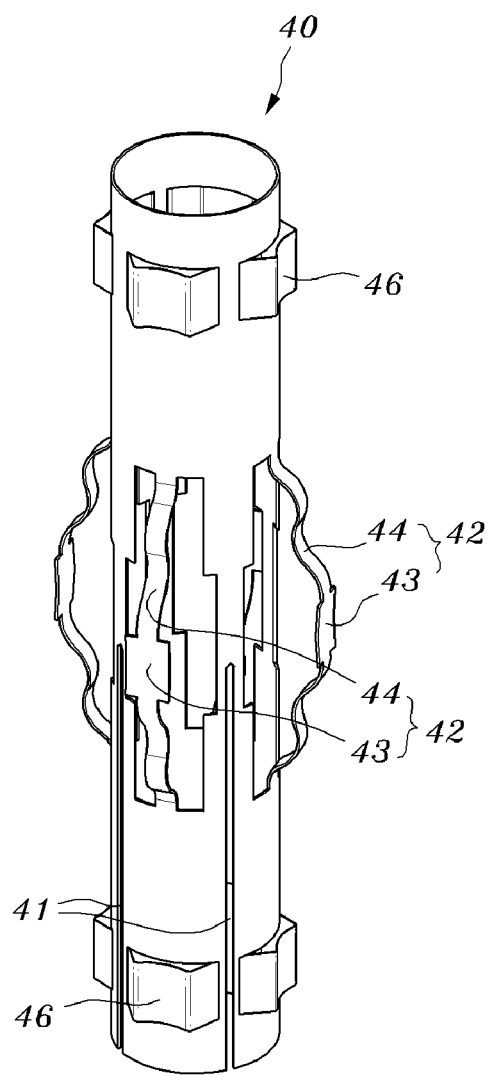
FIG. 22 is a perspective view illustrating a support structure, which is applied to a third embodiment of the present invention and to which dimples are additionally provided.

As illustrated in FIG. 22, the circumference of the support structure 40 illustrated in FIG. 19 is additionally provided with dimples 46 at upper and lower portions thereof in order to maintain sound supporting performance of each dual-cooling nuclear fuel rod 10.

The dimples 46 protrude from the circumference of the support structure 40 toward the respective dual-cooling nuclear fuel rods 10 so as to be in surface contact with the outer circumferences of the dual-cooling nuclear fuel rods 10, and each have a concave contact face, the curvature of which is equal to that of the outer circumference of each dual-cooling nuclear fuel rod 10 after each dual-cooling nuclear fuel rod 10 is charged.

In FIG. 22, although each dimple 46 has a concave contact face, the curvature of which is equal to that of the outer circumference of each dual-cooling nuclear fuel rod 10, so as to be in surface contact with the outer circumference of each dual-cooling nuclear fuel rod 10, each dimple may have a contact face having a convex shape or a simple planar shape which protrudes toward each dual-cooling nuclear fuel rod 10 in order to ensure reliable supporting performance of each dual-cooling nuclear fuel rod 10.

Figure 23:
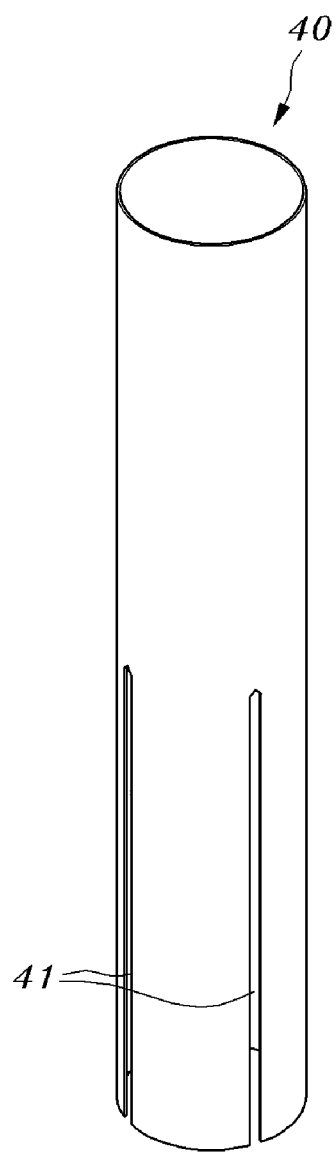
FIG. 23 is a perspective view illustrating a support structure applied to a fourth embodiment of the present invention.

FIG. 23 illustrates a support structure applied to a fourth embodiment of the present invention. The support structure 40 is provided with four slits 41 in the circumference of a cylindrical tube at right angles so as to be coupled with the first fastening slits 22 and the second fastening slits 32. Thus, each dual-cooling nuclear fuel rod 10 is supported by directly contacting the outer circumference of the support structure 40.

At this time, the interval between the first slit 41 in the circumference of the support structure 40 and the third slit 41 facing the first slit in a diagonal direction must be equal to the interval between the first fastening slits 22 of each of the first grid straps 20 and the interval between the second fastening slits 32 of each of the second grid straps 30.

In the first, second and third embodiments, the support structure 40 is formed by bending the rectangular sheet at a right angle, or by rolling the rectangular sheet in a cylindrical shape. However, in the fourth embodiment, the support structure 40 is provided using the cylindrical tube itself, having a circular cross section, and performs punching on the slits 41 arranged at each right angle using a press machine or the like.

Figure 24:
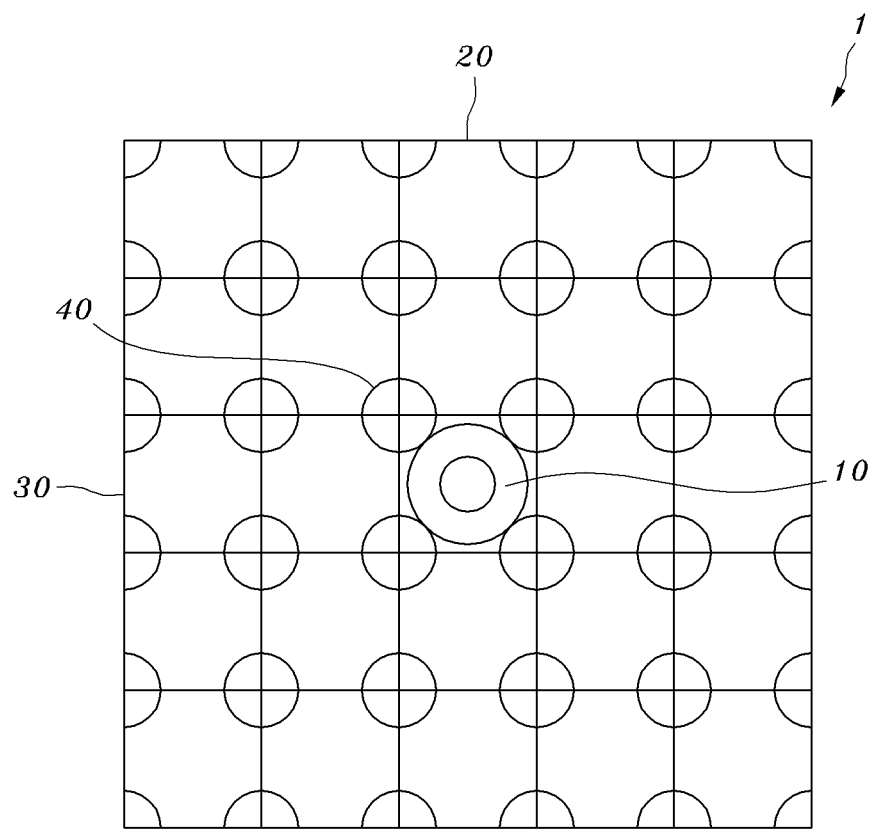
FIG. 24 is a top plan view illustrating a spacer grid according to a fourth embodiment of the present invention.

Thus, as in FIGS. 24 and 25, the support structures 40 are fitted into the first and second grid straps 20 and 30 around the intersections of the first and second grid straps 20 and 30, and then are coupled with the first and second grid straps 20 and 30 by, for instance, welding. For example, as shown in FIG. 25, welds 50 are formed to connect upper portions of the support structures 40 to the first and second grid straps 20 and 30. Similar welds (not shown) may be formed to connect lower portions of the support structures 40 to the first and second grid straps 20 and 30. Thereby, the dual-cooling nuclear fuel rods 10 are accommodated into square spaces surrounded by the first and second grid straps, and thus the outer circumferences thereof are in direct contact with the outer circumferences of the support structures 40, which have the circular cross section and are fitted into the first and second grid straps around the intersections of the first and second grid straps. As a result, the dual-cooling nuclear fuel rods 10 can be stably supported using the intrinsic rigidity of each support structure 40.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A spacer grid for dual-cooling nuclear fuel rods using intersectional support structures, the spacer grid comprising:
    first grid straps and second grid straps, which are crossed and arranged in transverse and longitudinal directions at regular intervals and have a shape of a flat strip; and
    support structures, each of which is fitted into the first and second grid straps around a respective intersection of the first and second grid straps, the support structures being configured to support the dual-cooling nuclear fuel rods,
    wherein the first grid straps each include first grid slits spaced apart from each other at regular intervals at an upper portion thereof, and first fastening slits formed on opposite sides of the respective first grid slits at an upper portion of each of the first grid straps; and
    the second grid straps each include second grid slits spaced apart from each other at regular intervals at a lower portion thereof, and second fastening slits formed on opposite sides of the respective second grid slits at an upper portion of each of the second grid straps,
    wherein each support structure comprises:
        a prism having a quadrilateral cross section; and
        slits at each corner of the prism coupled with corresponding first fastening slits and second fastening slits.

2. The spacer grid of claim 1, wherein each support structure comprises:
    supports configured to support the dual-cooling nuclear fuel rods, the supports comprising faces configured to support the dual-cooling nuclear fuel rods.

3. The spacer grid of claim 1, wherein each support comprises:
    a contact portion, which protrudes from a prism face of the support structure and is configured to contact with an outer circumference of a dual-cooling nuclear fuel rod after the dual-cooling nuclear fuel rod is charged; and
    connector portions, which extend from upper and lower ends of the contact portion in a curved shape and connect the contact portion to the prism face.

4. The spacer grid as set forth in claim 3, wherein each support structure additionally includes dimples in upper and lower portions of each support.

5. The spacer grid as set forth in claim 1, wherein each support structure includes supports having one of concave, convex and planar shapes in a longitudinal direction on faces thereof so as to be configured to contact outer circumferences of the dual-cooling nuclear fuel rods.

6. The spacer grid as set forth in claim 5, wherein the support having the concave shape has a curvature equal to that of the outer circumference of each dual-cooling nuclear fuel rod after each dual-cooling nuclear fuel rod is charged.

7. The spacer grid as set forth in one of claims 2 through 6, wherein each support structure is formed by bending a rectangular sheet at a right angle.

8. The spacer grid as set forth in claim 1, wherein each support structure includes four slits in a circumference of a cylinder having a circular cross section at right angles so as to be coupled with the first fastening slits and the second fastening slits, and supports supporting the dual-cooling nuclear fuel rods between the four slits.

9. The spacer grid as set forth in claim 8, wherein each support includes a contact portion, which comes into contact with an outer circumference of each dual-cooling nuclear fuel rod after each dual-cooling nuclear fuel rod is charged, and connector portions, which extend from upper and lower ends of the contact portion in a curved shape.

10. The spacer grid as set forth in claim 9, wherein each support structure additionally includes dimples in upper and lower portions of each support.

11. The spacer grid as set forth in claim 4 or 10, wherein each dimple includes a contact face having one of concave, convex and planar shapes so as to be in contact with the outer circumference of each dual-cooling nuclear fuel rod.

12. The spacer grid as set forth in claim 3 or 9, wherein the contact portion has a concave shape so as to have a curvature equal to that of the outer circumference of each dual-cooling nuclear fuel rod after each dual-cooling nuclear fuel rod is charged.

13. The spacer grid as set forth in claim 3 or 9, wherein the contact portion has a convex shape protruding toward a space where each dual-cooling nuclear fuel rod is to be mounted.

14. The spacer grid as set forth in claim 3 or 9, wherein the contact portion has a planar shape.

15. The spacer grid as set forth in claim 8, wherein each support structure is formed by rolling a rectangular sheet into a cylindrical shape.

16. The spacer grid as set forth in claim 1, wherein each support structure includes four slits in a circumference of a cylindrical tube at right angles so as to be coupled with the first fastening slits and the second fastening slits, and each dual-cooling nuclear fuel rod is supported by directly contacting an outer circumference of each support structure.

17. The spacer grid as set forth in claim 1, wherein the first grid straps, the second grid straps, and the support structures are welded to each other.

18. A spacer grid for dual-cooling nuclear fuel rods using intersectional support structures, the spacer grid comprising:
    first grid straps and second grid straps, which are crossed and arranged in transverse and longitudinal directions at regular intervals and have a shape of a flat strip; and
    support structures, each of which is fitted into the first and second grid straps around a respective intersection of the first and second grid straps, the support structures being configured to support the dual-cooling nuclear fuel rods,
    wherein the first grid straps each include first grid slits spaced apart from each other at regular intervals at a lower portion thereof, and first fastening slits formed on opposite sides of the respective first grid slits at the lower portion of each of the first grid straps; and
    the second grid straps each include second grid slits spaced apart from each other at regular intervals at an upper portion thereof, and second fastening slits formed on opposite sides of the respective second grid slits at a lower portion of each of the second grid straps,
    wherein each support structure comprises:
        a prism having a quadrilateral cross section; and slits at each corner of the prism coupled with corresponding first fastening slits and second fastening slits.

19. The spacer grid of claim 18, wherein each support structure comprises:
supports configured to support the dual-cooling nuclear fuel rods, the supports comprising faces configured to support the dual-cooling nuclear fuel rods.

20. The spacer grid of claim 18, wherein each support comprises:
a contact portion, which protrudes from a prism face of the support structure and is configured to contact with an outer circumference of a dual-cooling nuclear fuel rod after the dual-cooling nuclear fuel rod is charged; and
connector portions, which extend from upper and lower ends of the contact portion in a curved shape and connect the contact portion to the prism face.

\* \* \* \* \*